United States Patent
Flanigan et al.

(10) Patent No.: US 7,582,978 B2
(45) Date of Patent: Sep. 1, 2009

(54) AUXILIARY POWER UNIT FOR A MOTOR VEHICLE

(75) Inventors: Galen D. Flanigan, New Holstein, WI (US); Eric D. Albsmeier, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 205 days.

(21) Appl. No.: 11/560,919

(22) Filed: Nov. 17, 2006

(65) Prior Publication Data

US 2008/0136257 A1    Jun. 12, 2008

(51) Int. Cl.
F02B 63/04    (2006.01)
H02K 7/18    (2006.01)

(52) U.S. Cl. .................................................. 290/1 A
(58) Field of Classification Search ................ 290/1 A
See application file for complete search history.

(56) References Cited

U.S. PATENT DOCUMENTS

| | | | | |
|---|---|---|---|---|
| 2,740,079 A * | 3/1956 | Montgomery | ............... | 388/806 |
| 3,002,143 A * | 9/1961 | Reuther | ........................ | 322/36 |
| 3,239,746 A * | 3/1966 | Hallidy | ......................... | 322/25 |
| 3,509,447 A * | 4/1970 | Wharton | ....................... | 322/87 |
| 3,551,784 A * | 12/1970 | Fred et al. | ..................... | 322/90 |
| 4,109,743 A * | 8/1978 | Brusaglino et al. | ......... | 180/65.4 |
| 4,136,432 A | 1/1979 | Melley | ......................... | 29/469 |
| 4,233,555 A * | 11/1980 | Roche | ........................... | 322/25 |
| 4,672,296 A | 6/1987 | Griffin | ............................ | 322/1 |
| 4,677,365 A * | 6/1987 | Yang | .............................. | 322/90 |
| 4,739,466 A * | 4/1988 | Glennon et al. | ............... | 363/89 |
| 4,756,359 A | 7/1988 | Greer | ............................ | 165/43 |
| 4,807,106 A * | 2/1989 | Baker et al. | .................... | 363/84 |
| RE33,687 E | 9/1991 | Greer | ............................ | 165/43 |
| 5,252,926 A * | 10/1993 | Menegoli | ..................... | 324/545 |
| 6,111,768 A * | 8/2000 | Curtiss | ......................... | 363/98 |
| 6,262,896 B1 * | 7/2001 | Stancu et al. | .................. | 363/17 |
| 6,366,060 B1 * | 4/2002 | Ely et al. | ....................... | 322/25 |
| 6,756,693 B2 | 6/2004 | Kennedy | ..................... | 290/1 A |
| 6,906,479 B2 * | 6/2005 | Xu et al. | ...................... | 318/140 |
| 7,034,410 B2 | 4/2006 | Kennedy | ..................... | 290/1 A |
| 7,034,414 B1 | 4/2006 | Foerg et al. | .................. | 307/150 |

(Continued)

OTHER PUBLICATIONS

F & R Power Inc.—Alpha Generators—Marine diesel Generators—Kubota 6000 Watts, 60Hz datasheet. http://www.bmzgenerators.com/kubota6000.htm (no date).*

(Continued)

*Primary Examiner*—Nicholas Ponomarenko
*Assistant Examiner*—Pedro J Cuevas
(74) *Attorney, Agent, or Firm*—Quarles & Brady, LLP; George E. Haas

(57) ABSTRACT

An auxiliary power unit for a motor vehicle includes an auxiliary engine with an output shaft directly connected to a generator. The generator has a field winding and three output windings. A first output winding produces 120 volts AC that is applied to standard electrical outlets in the vehicle. A second output winding produces a low AC voltage that is converted to 12 volts DC and applied to the battery of the truck, thereby charging the battery and powering the vehicle's electrical system when the primary engine of the vehicle is off. An auxiliary winding in which another AC voltage is produced that is used by a controller to excite the field winding. A novel enclosure for the auxiliary power unit also is described.

22 Claims, 2 Drawing Sheets

U.S. PATENT DOCUMENTS

| | | |
|---|---|---|
| 7,049,707 B2 | 5/2006 | Wurtele .................. 290/1 B |
| 7,348,764 B2 * | 3/2008 | Stewart et al. ............ 322/24 |
| 2003/0070849 A1 | 4/2003 | Whittaker ............... 180/68.2 |
| 2004/0027078 A1 * | 2/2004 | Xu et al. ................. 318/107 |
| 2006/0208710 A1 * | 9/2006 | Velhner et al. ............ 322/58 |
| 2008/0012538 A1 * | 1/2008 | Stewart et al. ............ 322/89 |
| 2008/0265670 A1 * | 10/2008 | Pansier .................... 307/12 |

OTHER PUBLICATIONS

Brochure for the AXP 1000 Auxiliary Power Unit, made by Energy and Engine Technology Corporation, Plano Texas from internet site www.axp1000.com, 5 pages.

AN1003 Phase Control Using Thyristors, Littelfuse, Inc., pp. 1-9, 2004.

* cited by examiner

AUXILIARY POWER UNIT FOR A MOTOR VEHICLE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention generally relates to auxiliary power generators that produce electric current; and more particularly to an auxiliary power generator for use on a vehicle that has an internal combustion engine, wherein the auxiliary power generator provides electrical power during periods when the main engine is shut off.

2. Description of the Related Art

Long haul trucks, such as semi-trailer trucks, have an operator cab with an off duty compartment that provides living quarters for the driver to use at a rest area, a truck stop or other parking lot. The off duty compartment can be relatively spacious and elaborate containing a bed, food preparation appliances, such as a refrigerator and a microwave oven, and entertainment equipment, such as a television and an audio system. Although the truck is not moving while the driver is in the off duty compartment, it is common practice to keep the truck's engine idling to provide heat, air conditioning, and electricity.

This practice gave rise to environmental concerns as the relatively large diesel engine of the truck produced a sizeable amount of exhaust gases. A typical truck stop often had dozens of trucks each idling for several hours. In response, governmental agencies promulgated regulations requiring that the engine be shut off when the truck will not resume moving in a short period of time, such as when the driver is sleeping or the truck is being loaded or unloaded.

For times when the main engine must be shut off while the driver in the off duty compartment, an auxiliary power unit (APU) has been provided that runs on diesel fuel and drives an electricity generator. The APU generates electricity to operate a cab heating and cooling system, the food preparation appliances, and the entertainment equipment, as well as for recharging the truck battery which powers interior lighting. The various apparatus in the truck operate at different voltage levels. The appliances and other electrical equipment typically require 120 AC power (or 240 volt AC in some countries), while 12 volts DC is needed to recharge the truck battery and operate the interior lights.

One approach to providing these different voltage levels was for the APU to generate 12 volts DC that is compatible with the truck's electrical system and use an inverter to convert some of the APU output to the 120 or 240 volt AC. Another approach is to generate 120 or 240 volt AC and convert a portion to 12 volts DC. However, both approaches consume a certain amount of the generated power in the conversion process. That inefficiency also requires that the engine in the APU be large enough to overcome the extra losses associated with conventional auxiliary power units. Furthermore, the additional circuitry adds weight, complexity, maintenance requirements and cost without offering any significant advantages.

Another concern is the effect that an auxiliary power unit has on the fuel economy of the truck. In this regard, the additional weight of the APU is important. Conventional APU's use an adapter that employs a belt, chain, clutch or gear set to couple the auxiliary engine to the generator, which adds weight as well as mechanical complexity and additional maintenance requirements. Another issue is the effect that the APU has on the aerodynamics and appearance of the vehicle. To improve fuel economy, trucks are styled to be as aerodynamic and possible. As a result, it is desirable that the APU blend into the body of the truck and not negate the aerodynamic characteristic. However, the APU requires periodic maintenance and still must be readily accessible to service personnel.

SUMMARY OF THE INVENTION

An auxiliary power unit is provided for a motor vehicle that has a primary engine and a battery connected to an electrical system to which the primary engine is connected. The auxiliary power unit includes an auxiliary engine that has an output shaft, which preferably is directly connected to a generator. The generator has a rotor with a field winding thereon and a stator with first and second output windings. The first output winding produces a first voltage (e.g. 120 volts) of alternating current for standard electrical outlets in the vehicle, and a second output winding in which a second voltage is generated for powering the electrical system.

A preferred embodiment of the generator also has an auxiliary winding in which a third voltage is generated and used to excite the field winding.

A controller senses either the first voltage, the second voltage, or the third voltage and in response thereto controls electrical excitation of the field winding. In the preferred embodiment, the first voltage is sensed and the third voltage is used to produce a voltage for exciting the field winding. The controller varies the exciting voltage to regulate the first voltage to a desired level.

DETAILED DESCRIPTION OF THE INVENTION

Figure 1:
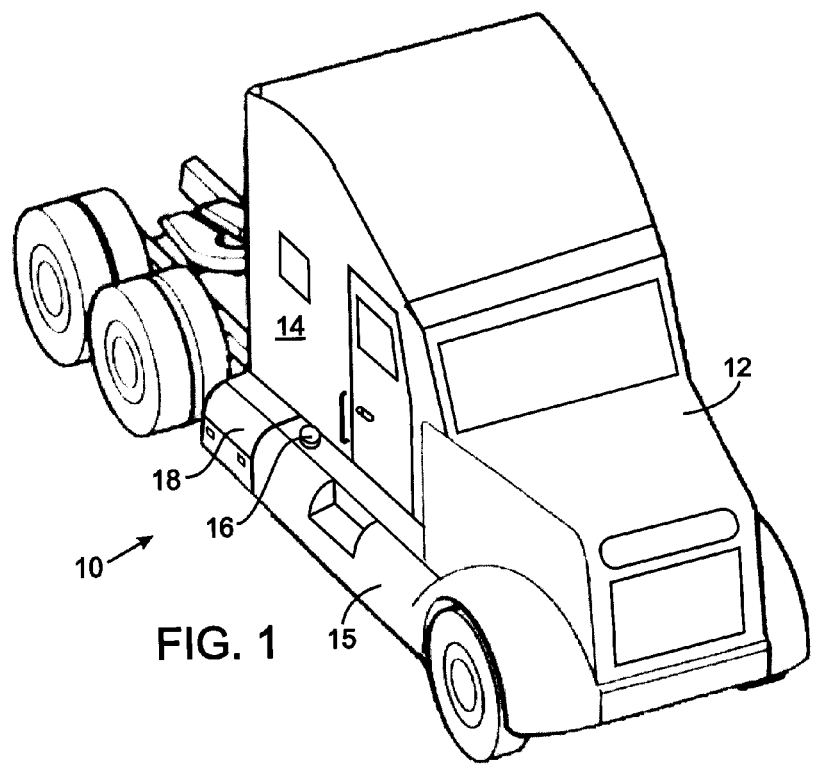
FIG. 1 is an perspective view of a tractor for a semi-trailer truck that incorporates an auxiliary power unit according to the present invention.

With initial reference to FIG. 1, a typical long haul truck 10 features a tractor portion 12 and a trailer (not shown) which is articulated to the tractor. The truck has an off duty compartment 14 that contains food preparation equipment and entertainment systems that require electrical power. The truck 10 has a conventional primary diesel engine that receives fuel from a tank 16 which is mounted alongside the tractor cab between the front and rear wheels. A transmission coupled to the primary diesel engine drives the rear wheels of the tractor 12 to propel the truck. The primary engine drives an alternator that charges a battery that together supply electricity to an electrical system to which the primary engine, lights and other electrical device are connected.

The truck 10 also includes an auxiliary power unit (APU) 18 located on the side of the truck immediately behind the fuel tank 16. Although the present APU is being described in the context of use on a long haul truck, it can be used on other types of vehicles, such as motor homes, motor coaches and camping trailers, for example.

Figure 2:
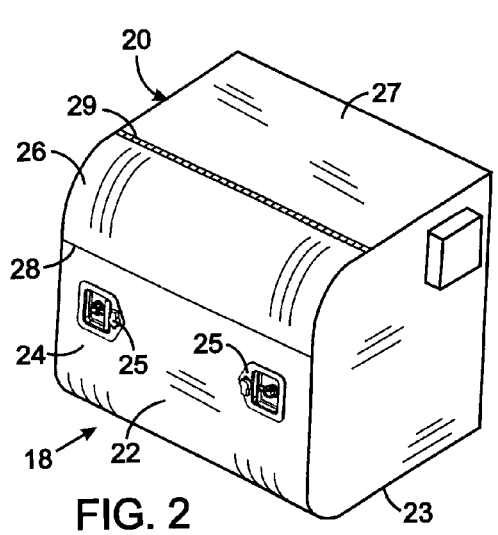
FIG. 2 is an perspective view of a closed housing of the auxiliary power unit.

As shown in FIG. 2, the auxiliary power unit 18 is enclosed in a separate six-sided cabinet, or housing 20. The front 22 of the housing has curved upper and lower edges which match the curvature of the fuel tank 16 and running board 15 along the lower side of the truck 10. This curvature match aerodynamically blends the separate generator housing 20 into the truck body minimizing air flow resistance along the lower side of the truck. The generator housing 20 is fabricated of bright aluminum which matches the appearance of the exterior of the fuel tank 16, thereby blending aesthetically into that portion of the truck body. If the fuel tank and running board 15 is painted, the exterior of the generator housing 20 can be similarly painted to provide an aesthetic match.

Figure 3:
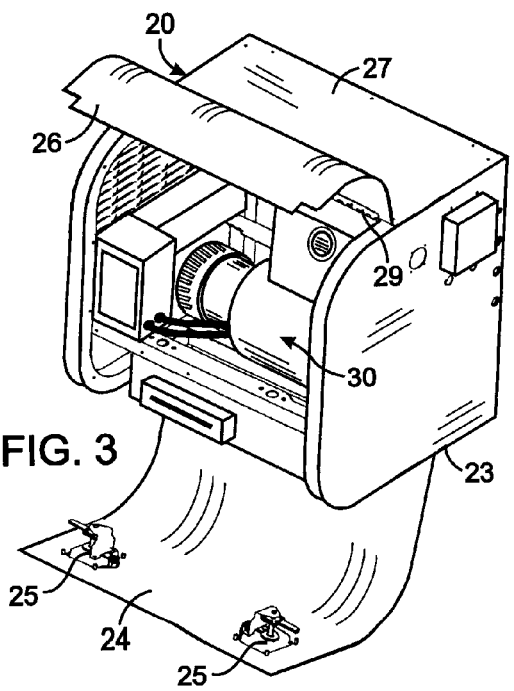
FIG. 3 is an perspective view of the opened housing.

The front housing 20 is formed by two doors 24 and 26 which overlap at a horizontal seam 28. The upper door is connected by a hinge 29 to the top 27 of the housing so as to pivot upward, as shown in FIG. 3, to open the housing and gain access to the internal components of an engine-generator set 30 therein. The lower door 24 is similarly hinged to the bottom 23 of the housing 20 and pivots downward when the housing is opened. The lower door 24 has a pair of latches 25 that engage brackets on the interior sides of the housing to hold the front doors 24 and 26 in a locked, closed state.

Figure 4:
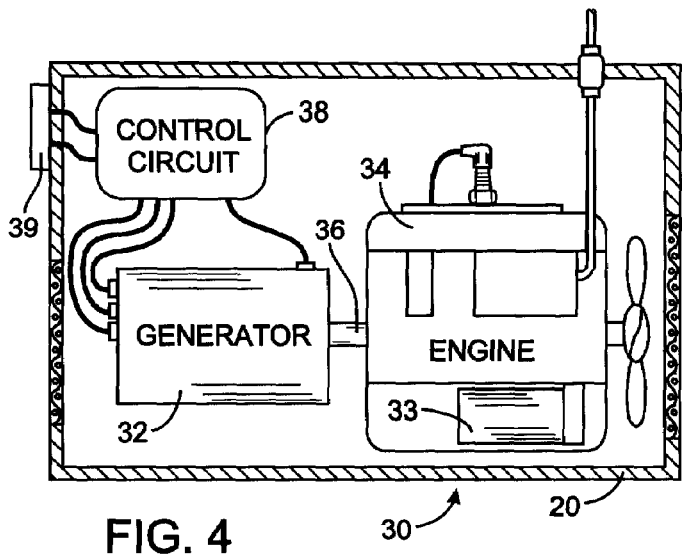
FIG. 4 is a conceptual depiction of the components of the auxiliary power unit.

FIG. 4 schematically depicts the engine-generator set 30 that is within the housing 20. That assembly includes a single-cylinder, air-cooled auxiliary engine 34 which drives a generator 32, that preferably is a two-pole alternator. The auxiliary engine 34 has an electric starter 33 that receives electricity from the battery of the truck to start the engine. The generator 32 is directly connected to the output shaft 36 e.g. crankshaft) of the auxiliary engine. That direct-drive connection eliminates pulleys, belts, and other types of coupling members often used to drive an generator from an engine, which components add weight and maintenance complexity to the equipment. Therefore, as used herein the term "directly connected" means that the generator's rotor is either mounted on the output shaft 36 of the auxiliary engine 34 or the rotor has a shaft that is attached to the engine's output shaft without employing any gears, pulleys and belts, or sprockets and chains. The electrical output of the generator 32 is connected to a control circuit 38 which is coupled to an output terminal block 39 of the engine-generator set 30.

Figure 5:
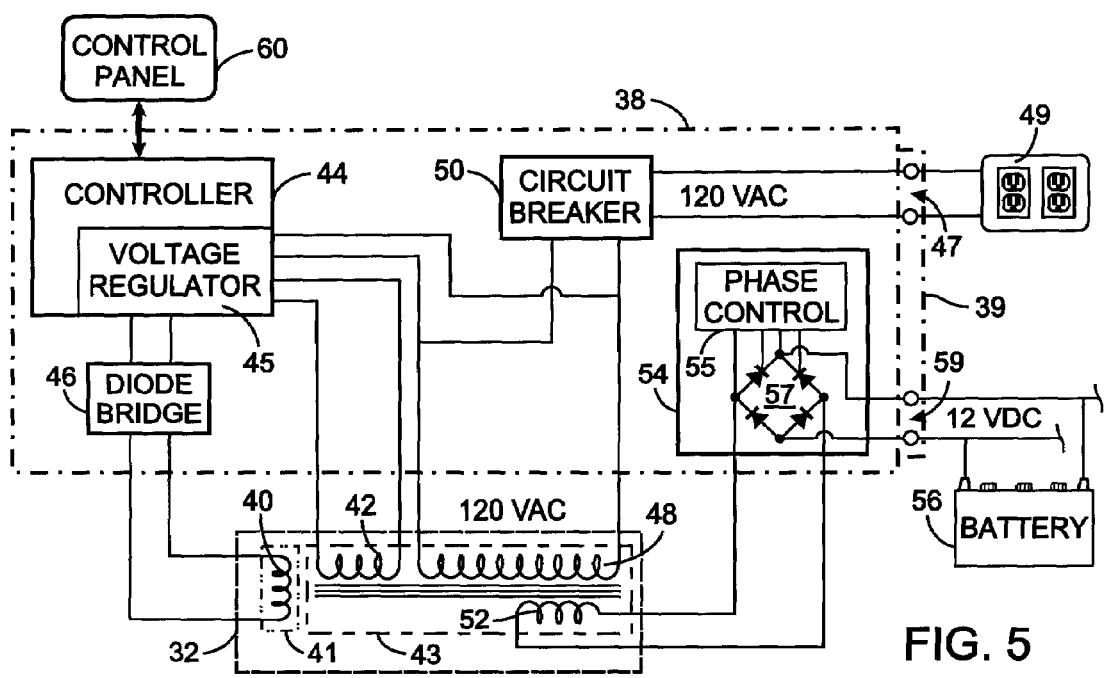
FIG. 5 is a schematic circuit diagram of the auxiliary power unit.

With reference to FIG. 5, the generator 32 has a rotor 41 that is connected to the output shaft 36 of the auxiliary engine 34 and a conventional field winding 40 is wound on the rotor. The generator 32 has a stator 43 on which is wound a first output winding 48 that produces a first voltage of 120 volts AC (alternatively, 240 VAC in some countries). The first output winding 48 is coupled via a circuit breaker 50 to a first output connector 47 coupled to electrical outlets 49 and other power device connections in the off duty compartment 14 of the truck. The electrical outlets 49 are provided for supplying power to food preparation appliances, entertainment equipment and other electrical devices. A second output winding 52 on the stator 43 produces a second voltage (e.g. 12-18 volts) of alternating current that is provided to an AC to DC converter 54, in which the alternating current is transformed into 50 amps of 12 volt direct current. The converter 54 comprises a phase control circuit 55 that operates a power SCR bridge 57. Specifically the phase control circuit 55 determines the conduction angle of the alternating current cycle at which to switch a pair of SCR's in the bridge 57 on and off to produce a constant 12 volts DC from the AC to DC converter 54. That DC output of the converter 54 is applied via a second output connector 59 to the truck's battery 56 and thus the electrical system of the of the truck 10, thereby enabling the APU 18 to power the conventional truck circuits, while the primary engine is turned off. That connection also maintains the battery 56 charged. Although the first and second output windings are stated as producing specific voltage levels, it should be understood that other voltage levels can be produced without departing from the novel concepts of the present invention. For example, the electrical equipment in the off duty compartment may operate at a different voltage (e.g. 240 volts) and the truck's electrical system may be other than 12 volts.

An auxiliary winding 42 on the stator 43 produces alternating current which is used by a controller 44 in the APU control circuit 38 to excite the field winding 40. The controller 44 is connected to a control panel 60 in the diver cab of the truck and is an electronic circuit that supervises operation of the APU. One supervisory function is to regulate the output voltage of the generator 32. To accomplish that function, a voltage regulator 45 of the controller 44 senses the AC output voltage generated by the first output winding 48 and in response varies excitation of the field winding 40 so that the AC output voltage is maintained at 120 volts. Specifically, the voltage regulator 45 uses the third voltage from the auxiliary winding 42 to produce an excitation voltage that is varied in response to the sensed voltage from the first output winding 48. The excitation voltage is applied via a diode bridge 46 to the field winding 40. The diode bridge 46 acts as a rectifier transforming the AC voltage from the auxiliary winding 42 to a DC voltage that excites the field winding 40. This regulation of the field winding excitation also maintains the voltage produced by second output winding 52 at its desired level.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. An auxiliary power unit for a motor vehicle that is powered by a primary engine and that has a battery connected to an electrical system to which the primary engine is connected, said auxiliary power unit comprising:
   an auxiliary engine having an output shaft;
   a generator having a rotor with a field winding wound thereon and coupled to the output shaft, a first output winding in which a first voltage of alternating current is generated for application to electrical outlets in the motor vehicle for powering AC loads, a second output winding in which a second voltage is generated for powering the electrical system, and an auxiliary winding in which a third voltage is generated; and
   a controller that senses one of the first voltage, the second voltage and the third voltage and in response thereto controls excitation of the field winding with the third voltage in a manner wherein the third voltage is used exclusively for exciting the field winding.

2. The auxiliary power unit as recited in claim 1 wherein the second output winding generates alternating current, and further comprising a converter connected to the second output winding to receive the second voltage and producing a DC voltage that is applied to the electrical system.

3. The auxiliary power unit as recited in claim 2 wherein the converter comprises a phase control circuit that operates a power SCR bridge connected to the second output winding.

4. The auxiliary power unit as recited in claim 1 wherein the first voltage is one of 120 volts or 240 volts, and the second voltage is 12 volts.

5. The auxiliary power unit as recited in claim 1 wherein the auxiliary winding generates alternating current.

6. The auxiliary power unit as recited in claim 1 wherein the controller controls an excitation voltage that is derived only from the auxiliary winding and that is applied to the field winding.

7. The auxiliary power unit as recited in claim 1 wherein the rotor is directly connected to the output shaft of the engine.

8. The auxiliary power unit as recited in claim 1 further comprising a housing in which the auxiliary engine and the generator are mounted, wherein the housing comprises a top, a bottom, a first door having a raised position in which the first door extends above the top and a lowered position in which the first door extends below the top across a front of the housing, and a second door having a lowered position in which the second door extends below the bottom and a raised position in which the first door extends above the bottom and abuts the first door.

9. An auxiliary power unit for a motor vehicle that is powered by a primary engine and that has a battery connected to an electrical system to which the primary engine is connected, said auxiliary power unit comprising:
   a first output connector for connection to electrical outlets in the motor vehicle;
   a second output connector for connection to the electrical system;
   an auxiliary engine having an output shaft; and
   an generator having a rotor with a field winding wound thereon, a first output winding in which a first AC voltage is generated and which is connected to the first output connector, a second output winding in which a second AC voltage is generated, and an auxiliary winding in which an excitation voltage is generated;
   a converter connected to the second output winding to receive the second AC voltage, and producing a DC voltage that is applied to the second output connector; and
   a controller which includes a voltage regulator that responds to one of the first AC voltage and the second AC voltage by regulating application of the excitation voltage to the field winding to regulate the first AC voltage.

10. The auxiliary power unit as recited in claim 9 wherein the controller senses the first AC voltage and in response thereto controls excitation of the field winding.

11. The auxiliary power unit as recited in claim 9 wherein the controller uses only the third voltage to excite the field winding.

12. The auxiliary power unit as recited in claim 11 wherein the auxiliary winding generates alternating current, and comprising a rectifier which converts the alternating current generated by the auxiliary winding into direct current that is applied to the field winding.

13. The auxiliary power unit as recited in claim 9 wherein the rotor is directly connected to the output shaft of the engine.

14. The auxiliary power unit as recited in claim 9 wherein the converter comprises a phase control circuit that operates a power SCR bridge connected to the second output winding.

15. The auxiliary power unit as recited in claim 9 further comprising a housing in which the auxiliary engine and the generator are mounted, wherein the housing comprises a top, a bottom, a first door hinged adjacent the top and having a raised position in which the first door extends above the top and a lowered position in which the first door extends below the top, and a second door hinged adjacent the bottom and having a lowered position in which the second door extends below the bottom and a raised position in which the first door extends above the bottom and abuts the first door.

16. An auxiliary power unit for a motor vehicle that is powered by a primary engine and that has a battery connected to an electrical system to which the primary engine is connected, said auxiliary power unit comprising:
   a first output connector for connection to electrical outlets in the motor vehicle;
   a second output connector for connection to the electrical system;
   an auxiliary engine having an output shaft; and
   an alternator having a rotor with a field winding wound thereon, a first output winding in which a first AC voltage is generated and which is connected to the first output connector, a second output winding in which a second AC voltage is generated, and an auxiliary winding in which a third AC voltage is generated;
   a converter connected to the second output winding and converting the second AC voltage into a DC voltage that is applied to the second output connector; and
   a controller connected to the auxiliary winding wherein the third AC voltage is only used to produce an excitation voltage for exciting the field winding.

17. The auxiliary power unit as recited in claim 16 further comprising a device that converts the excitation voltage into a DC voltage that is applied to the field winding.

18. The auxiliary power unit as recited in claim 16 wherein the controller senses one of the first AC voltage, second AC voltage and third AC voltage, and in response thereto controls excitation of the field winding.

19. The auxiliary power unit as recited in claim 16 wherein the rotor is directly connected to the output shaft of the engine.

20. The auxiliary power unit as recited in claim 16 wherein the converter comprises a phase control circuit that operates a power SCR bridge connected to the second output winding.

21. The auxiliary power unit as recited in claim 16 further comprising a housing in which the auxiliary engine and the alternator are mounted, wherein the housing comprises a top, a bottom, a first door hinged adjacent the top and having a raised position in which the first door extends above the top and a lowered position in which the first door extends below the top, and a second door hinged adjacent the bottom and having a lowered position in which the second door extends below the bottom and a raised position in which the first door extends above the bottom and abuts the first door.

22. The auxiliary power unit as recited in claim 5 further comprising a diode arrangement which converts the alternating current from the third winding into direct current for exciting the field winding.

* * * * *